Figure 1:
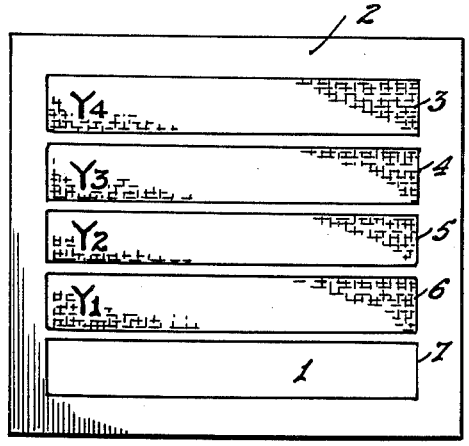

Dec. 25, 1962　　　　　I. BALINKIN　　　　　3,069,788
DEVICE FOR COLOR DEMONSTRATION
Filed July 3, 1961　　　　　　　　　　　　　　2 Sheets-Sheet 1

INVENTOR.
ISAY BALINKIN,
BY Allen & Allen
ATTORNEYS.

Dec. 25, 1962  I. BALINKIN  3,069,788
DEVICE FOR COLOR DEMONSTRATION
Filed July 3, 1961  2 Sheets-Sheet 2

INVENTOR.
ISAY BALINKIN
BY *Allen & Allen*
ATTORNEYS.

United States Patent Office 3,069,788
Patented Dec. 25, 1962

3,069,788
DEVICE FOR COLOR DEMONSTRATION
Isay Balinkin, 1337 N. Bend Road, Cincinnati 24, Ohio
Filed July 3, 1961, Ser. No. 123,943
10 Claims. (Cl. 35—28.3)

This is a continuation-in-part of my copending application of the same title, Serial No. 765,365, filed October 6, 1958, now abandoned.

The invention relates to a means for demonstrating color effects, and especially subtractive color phenomena. The device finds its principal utility in the field of classroom instruction.

It is difficult for students at the outset to maintain a clear understanding of the difference between additive and subtractive color phenomena, and they tend to expect from subtractive phenomena the same color effects they have observed under additive conditions.

When the human eye receives wave lengths of light of substantially equal intensity throughout the range of the visible spectrum, the sensation is one of white or grey. Where, however, there is a marked difference in the light intensity reaching the eye at the various wave lengths, or where wave lengths are missing in the incident light, the eye integrates the impressions received into a single color impression of particular hue, saturation, lightness or brightness.

When a beam of light passes through a first filter it will be modified as to its content of certain wave lengths. If a second filter is positioned so that the filtered beam passes through it, it will be still further modified as to its content of the same or other wave lengths. The actual transmissivity of a succession of filters at a given wave length is the product of their individual transmissivities at that wave length. As a consequence, where for example a filter which appears yellow to the eye is used in tandem with a filter which appears blue to the eye, the result may range from complete opacity to an emergent beam characterized by substantially any color in the spectrum, or grey, as observed. These results are surprising to the student beginner.

It is an object of the invention to provide a simple demonstration device for subtractive color phenomena.

It is an object of the invention to provide a device which, while it may be held in the hand for individual instruction is nevertheless capable of being projected on a screen for the instruction of a glass or group.

It is an object of the invention to provide a device permitting the use of a large number of filters in tandem, and a device in which a number of filters forming a group, may be used in tandem with a large number of other groups of filters.

It is an object of the invention to provide an instruction means wherein the subtractive effects of filters in tandem may be demonstrated, but wherein the individual filters may be observed at the same time.

It is an object of the invention in one of its aspects to provide a device wherein the transmissivity curves of individual filters may be juxtaposed so that the student can estimate or calculate the total transmissivity of any of the various combinations of filters.

It is an object of the invention in one of its aspects to provide an instruction means wherein a plurality of individual filters, the subtractive effects of these filters in tandem, the juxtaposed transmissivity curves of each pair of filters in tandem, and in at least one embodiment of the invention, the resulting transmissivity curve of the subtractive effect of each pair of filters in tandem may be observed at the same time.

It is an object of the invention to provide devices of the above characteristics, which are simple and economical to construct and use.

It is also an object of the invention to provide a device which may, under certain conditions, be used to demonstrate additive color phenomena.

Figure 2:
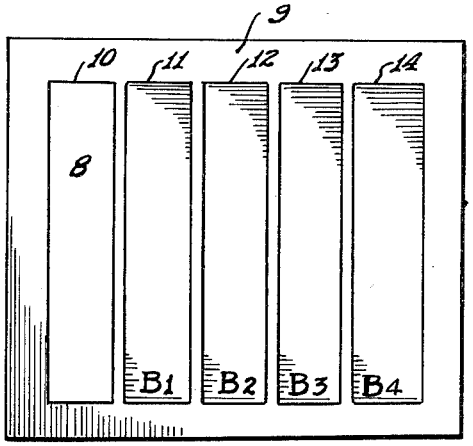
Figure 3:
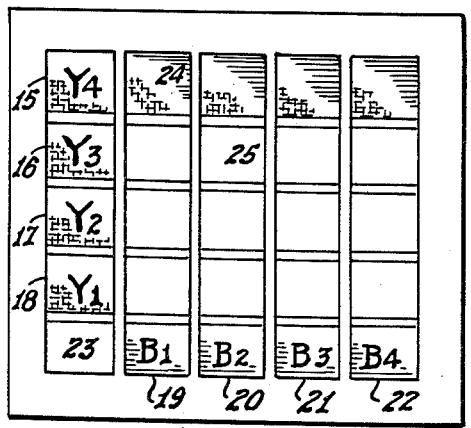
Figure 4:
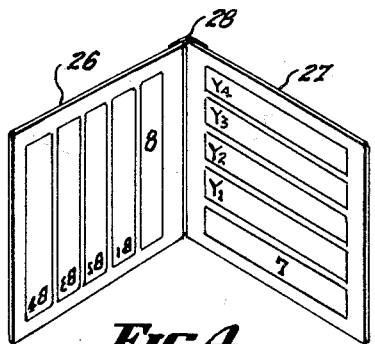
Figure 5:
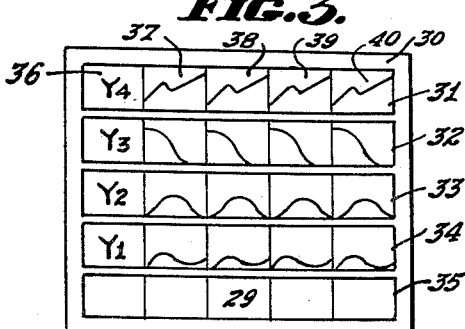
Figure 6:
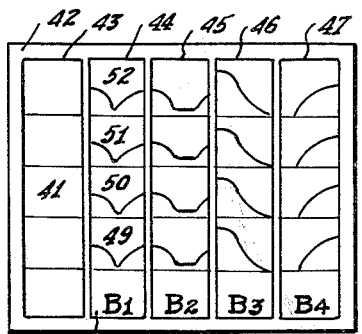
Figure 7:
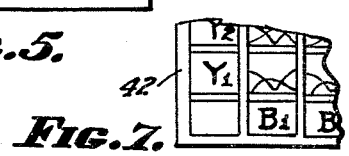
Figure 8:
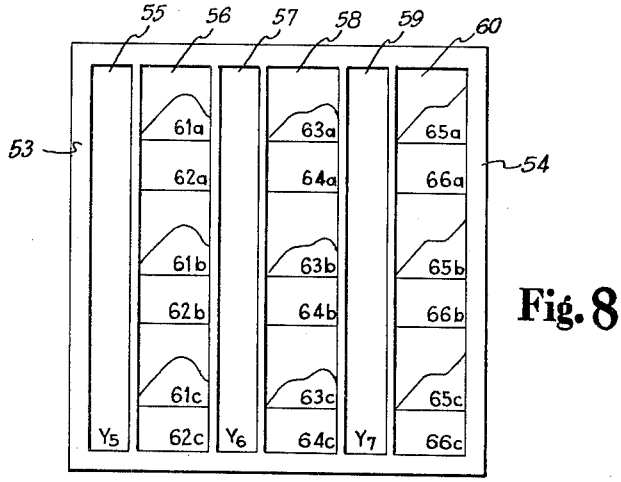
Figure 9:
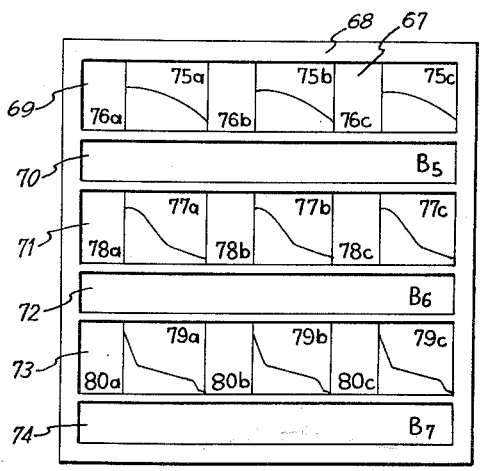
Figure 10:
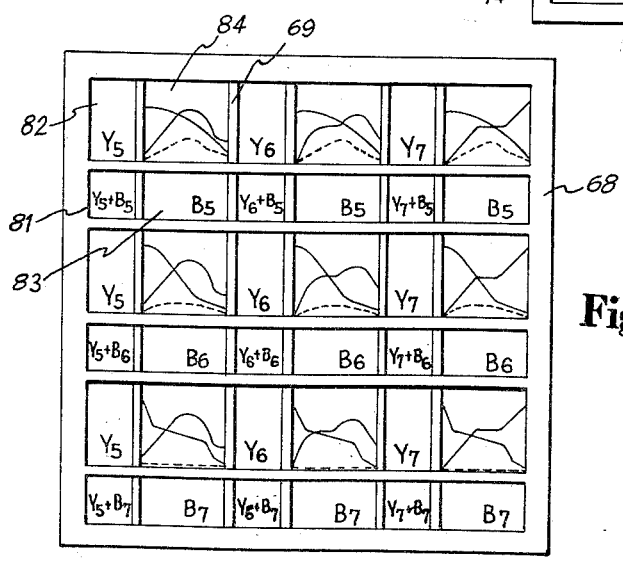

These and other objects of the invention which will be set forth hereinafter or will be apparent to one skilled in the art upon reading these specifications, are accomplished by that construction and arrangement of parts, of which certain exemplary embodiments will now be described. Reference is made to the accompanying drawings wherein:

FIG. 1 is a plan view of one element of the structure.
FIG. 2 is a plan view of the other element of the structure.
FIG. 3 is a plan view showing the elements in combination.
FIG. 4 is a perspective view showing the elements hinged together.
FIG. 5 is a plan view of a chart element.
FIG. 6 is a plan view of a cooperating chart element.
FIG. 7 is a partial plan view of the elements of FIGS. 5 and 6 in combination.
FIG. 8 is a plan view of one element of another embodiment of the present invention.
FIG. 9 is a plan view of another element of the said embodiment.
FIG. 10 is a plan view of the elements of FIGS. 8 and 9 in combination.

While size is not a limitation on the present invention, the elements are conveniently made of the standard size of slides for classroom projectors, generally 3¼ inches by 4 inches, and will be so described in the exemplary embodiments. One of the elements of the invention is illustrated in FIG. 1 and comprises a transparent support 1 such as a lantern slide glass or a piece of plastic. The mask next to be described may be omitted if desired but is preferred because it enhances the general effect and obviates the distraction of white light on the screen. A mask is threfore illustrated at 2 having the same outer dimensions as the support 1 but provided with horizontally elongated uniformly spaced cutouts indicated at 3, 4, 5, 6, and 7. While a mask has been shown with five longitudinal cutouts, it will be understood that a greater or lesser number may be employed. All but one of the cutouts are covered with filters which in the drawings are designated as Y1, Y2, Y3, and Y4. These filters extend throughout the lengths of the cutouts, but it will be noted that the cutout 7 is left clear, i.e. it is not provided with a filter.

The elements thus far described may be made and assembled in various ways. The mask and the filters may be parts of a unitary colored photographic image on the slide glass 1. They may be imposed by printing. In general it is preferred to make an actual mask 2 of black opaque paper and to use for the filter elements pieces of commercially obtainable, accurately prepared films of filter material usually, though not necessarily in the form of dyed gelatin such as are used for photographic purposes. The structure of FIG. 1 can readily be prepared by laying the mask down on a transparent film of cellulose or synthetic plastic provided with a pressure sensitive coating on one surface (e.g. Mylar film). Then the various filter strips may be laid down across the mask openings and affixed by pressure to the pressure sensitive surface. Next a suitable adhesive may be applied to the border portions of the mask on the side away from the Mylar film and the sructure attached thereby to the glass 1. The Mylar film will serve as a protector for the other side of the structure. It is within the purview of this invention to bind the edges of the structure with lantern slide tapes as will be readily understood by the skilled worker in the art.

The other element of the combination is illustrated in FIG. 2. It comprises a transparent glass or plastic support 8 and a mask 9 provided with vertical cutouts of uniform width indicated at 10, 11, 12, 13 and 14. All but one of these cutouts will be covered by filters designated in FIG. 2 as B1, B2, B3, and B4. It will be noted that the cutout 10 is left uncovered.

The mode of construction of the means of FIG. 2 can be the same as that described for FIG. 1. In the illustrated embodiment the means of FIGS. 1 and 2 are designed to be used as a slide in a projector, the means being superposed on each other in registration. The result is that shown in FIG. 3 where the effective area of the composite slide is divided into a series of small rectangular areas. To the left in areas 15, 16, 17 and 18 the filters of the Y series will be presented individually to the beam of light passing through the projector. Similarly at the bottom in areas 19, 20, 21 and 22 the filters of the B series will be observable individually. There is one clear area 23 which does not have any filter. If desired this area may be blocked off by a part of one or the other of the masks when it is felt that white light provided through this area will detract from the effect of the subtractive colors produced by the combination of filters in the other areas. The other areas are all occupied by combinations of filters. Thus, area 24 shows the combination of filter Y4 and filter B1. Area 25 exhibits the combination of filter Y3 and filter B2, and so on. It will be evident from FIG. 3 that sixteen combinations have been made from four Y filters and four B filters.

It will be evident to one skilled in the art that when the elements are made separately as illustrated in FIGS. 1 and 2, a plurality of slides of each series may be made, thus providing for a very great number of combinations. If the index letter Y indicates a number of filters of generally yellowish hue and the index letter B indicates a plurality of filters of generally bluish hue, it will be evident that other slides may contain other combinations of filters either of the same general hues or of entirely different hues such as red, green, violet or the like. Thus any slide of the first series may be combined with any slide of the second series to provide a very large number of specific demonstrations of subtractive color effects. Where the slides are maintained separate, it becomes possible also to demonstrate additive color phenomena by projecting a slide of the first series in one projector and a slide of the second series in another projector, bringing the images of these slides into registry upon a screen. However, where permanently combined slides are desired for demonstration work, a pair of slides superposed as in FIG. 3 may be bound together by lantern slide tapes about their edges. Again it is possible as shown in FIG. 4 to hinge a pair of slides together so that while they may be separated for individual examination, they nevertheless will be permanently associated. In FIG. 4 the slide of FIG. 2 designated generally at 26 is shown hinged to the slide of FIG. 1 designated generally at 27 by means of a cloth or other tape member 28.

It has been indicated above that the transmissivity of a pair of filters used in tandem will be the product of the transmissivities of each filter at any given wave length. This can be demonstrated by means of the structure of FIGS. 5, 6 and 7. In FIG. 5 there is shown a slide on a base 29 having a mask with horizontal cutouts 31, 32, 33, 34 and 35 corresponding generally with the cutouts described in connection with the structure of FIG. 1. Cutouts 31 to 34 are divided into spaces. The first space 36 will bear a designation of a particular filter to which it appertains, and may indeed be covered with that filter for demonstration purposes. The other spaces such as 37, 38, 39 and 40 will be provided with transmissivity curves appropriate to the filter designated in space 36. These transmissivity curves may be reproduced on translucent paper or on translucent or transparent film and affixed in place as hereinabove described.

A second series structure is indicated in FIG. 6. It comprises a suitable transparent base 41 and preferably a mask 42 divided into vertical cutouts 43, 44, 45, 46 and 47. The first of these cutouts, 43, is left blank. The other cutouts are divided into spaces as shown. The lowermost space in each cutout, e.g. 48, carries a filter designation and may carry filters as before. The other spaces in the same cutout as at 49, 50, 51 and 52 carry transmissivity curves appropriate to the filter designated in the space 48. The other cutouts in the structure are similarly treated.

It will be evident that when the structures of FIGS. 5 and 6 are superposed as in FIG. 7, the transmissivity curves for the several filters will also be superposed, thus giving the student an indication of what is being transmitted by any of the combinations of filters shown in the device of FIG. 3. By the same token the student will be enabled to draw a transmissivity curve for any of these combinations of filters by calculating at selected wave lengths the product of the two transmissivity values indicated by the curves. In making up the slides of FIGS. 5 and 6 it is convenient, although not necessary to distinguish the transmissivity curves from each other by the use of suitable indicia or to reproduce the transmissivity curves in the colors of the filters to which they appertain so that when the curves are projected in superposition they may be distinguished from each other.

Another embodiment of the present invention is illustrated in FIGS. 8, 9 and 10. The materials used and methods of construction employed may be the same as those described with respect to the structures of FIGS. 1 to 7.

One element of this second embodiment is shown in FIG. 8. It comprises a transparent plastic or glass support 53, a mask 54 having vertical cutouts indicated at 55 through 60. The cutouts 55, 57 and 59 are covered by filters designated as Y5, Y6 and Y7 respectively. Mounted in the cutout 56 are three identical transmissivity curves 61a, 61b and 61c appropriate to the filter Y5. These transmissivity curves may be made in the manner described with respect to FIGS. 5 and 6. The spaces 62a, 62b and 62c below the respective transmissivity curves remain clear for reasons hereinafter explained. The cutout 58 contains three identical transmissivity curves 63a, 63b and 63c appropriate to the filter Y6, and aligned horizontally with the transmissivity curves in cutout 56. Clear spaces 64a, 65a and 66a in the cutout 58 appear below the transmissivity curves respectively, and are in horizontal alignment with the clear spaces in cutout 56. Similarly, cutout 60 contains three identical transmissivity curves 65a, 65b and 65c appropriate to the filter Y7, and three clear spaces 66a, 66b and 66c. It will be noted that the clear spaces form three horizontal clear bands, each of which intersects the three vertical filters Y5, Y6 and Y7.

The second element of the present embodiment is illustrated in FIG. 9, and comprises a transparent support 67 of glass or plastic and a mask 68 having a series of horizontal cutouts indicated at 69 through 74. The cutouts 70, 72 and 74 are covered by filters designated as B5, B6 and B7. Cutout 69 contains three identical transmissivity curves 75a, 75b and 75c appropriate to filter B5, and three clear spaces 76a, 76b and 76c. Similarly, transmissivity curves 77a, 77b and 77c appropriate to filter B6, and three clear spaces 78a, 78b and 78c are located in cutout 71; while three transmissivity curves 79a, 79b and 79c for filter B7 and three clear spaces 80a, 80b and 80c are located in cutout 73. It will be noted that in this element, the clear spaces form three vertical bands intersecting the three horizontal filters B5, B6 and B7.

FIG. 10 illustrates the superposition of the elements of FIGS. 8 and 9. The masks of the elements of FIGS. 8 and 9 coact to divide the entire area of the combined structures into a series of rectangular windows. The superposition of the structures result in nine windows showing all of the possible subtractive combinations of the Y filters of FIG. 8 with the B filters of FIG. 9. These nine windows are designated in FIG. 10 by the index characters of the filters combined (i.e. Y5+B5, Y6+B6, etc.). Thus the window 81 shows the subtractive result of the tandem arrangement of filters Y5 and B5. This tandem arrangement is achieved by the superposition of the filter B5 of the element of FIG. 9 on the filter Y5 of the element of FIG. 8.

In the adjacent window 82, only the filter Y5 is shown because this window consists of the tandem arrangement of the filter Y5 of FIG. 8 and the clear space 76a of FIG. 9. Similarly the window 83 shows only the filter B5, since it consists of the tandem arrangement of the filter B5 of FIG. 9 and the clear space 62a of FIG. 8. The window 84 shows the superposed transmissivity curves 61a (for filter Y5) and 75a (for filter B5). Thus it is seen that the arrangement of filters, clear spaces and transmissivity curves on the elements of FIGS. 8 and 9 is such that when the elements are combined, not only the tandem arrangement of the filters, but also the individual filters are displayed as well as their superposed transmissivity curves so as to be simultaneously observable at a glance. This same arrangement holds true for the remaining eight possible Y and B filter combinations.

The superposed transmissivity curves will enable the student to calculate the transmissivity curve for each tandem pair of filters in the manner described above. It will again be understood by one skilled in the art that if desired the transmissivity curves of the element of FIG. 8 may be distinguished from those of the element of FIG. 9 by the use of suitable indicia, the use of solid and broken lines or the reproduction of each transmissivity curve in the color of the filter to which it relates. It will further be understood by one skilled in the art that all of the transmissivity curves illustrated in FIGS. 5 through 10 are purely diagrammatical and are not intended to show specific or calculated values.

Although the elements of FIGS. 8 and 9 are shown to contain three filters each, a greater or lesser number may be employed. It would also be within the scope of the invention to hinge the elements of FIGS. 8 and 9 together in the manner described with respect to FIG. 4.

The present embodiment of the invention is illustrated in FIGS. 8 and 9 as consisting of two separate elements. This enables the element of FIG. 8 to be combined with selected ones of a plurality of elements similar to the one of FIG. 9 but containing other horizontally disposed filters, and the element of FIG. 9 to be combined with any of a plurality of elements similar to that of FIG. 8 containing different filters. Under some circumstances, however, it may be desirable to make the structure shown in FIG. 10 as a single unitary element. This may be done by affixing the elements of FIGS. 8 and 9 together permanently by any suitable means such as binding them together with lantern slide tape about their edges. It is also within the scope of the invention to mount all parts shown in FIG. 10 on a single transparent plastic or glass base in the manner described with respect to FIGS. 1, 2, 5 and 6. In such an arrangement, a single unitary mask containing the necessary rectangular windows may be employed. It will also be understood that, if desired, a transmissivity curve for the combined filters may be included in the several windows as indicated by dotted lines in FIG. 10, and that the windows displaying the curves may have ordinate and abscissa scales, not shown in the drawings.

Modifications may be made in the invention without departing from the spirit of it. The invention having been described in certain exemplary embodiments, what is claimed as new and desired to be secured by Letters Patent is:

1. In a demonstration device for subtractive color phenomena, a first member comprising a transparent support, the surface of said support presenting a series of substantially parallel areas extending horizontally substantially across the support, each of said areas excepting the lowermost being covered by a color filter, said color filters having transmissivities for different wave lengths of visible light, and a second member comprising a transparent support the surface of which presents a plurality of substantially parallel areas extending vertically substantially from top to bottom of said member, all but a marginal one of said areas being covered by another set of color filters having specifically different transmissivities for different wave lengths of visible light as viewed by transmitted light, the said members being superposable to provide along one side a series of areas in which the filters of the first member are visible alone, and along the bottom a series of areas in which the filters of the second member are visible alone, and in addition thereto a series of areas in each of which a filter of the first member and a filter of the second member are superposed on each other, the number of the last mentioned areas being equal to the number of possible combinations of the filters of the first member with the filters of the second member, and each of the areas formed by the superposition of the first and second members constituting windows for the transmission of light through the filters individually and through combinations of the filters.

2. The structure claimed in claim 1 wherein said members are of a size and shape for lantern slide projection.

3. The structure claimed in claim 1 wherein the said areas on the first and second mentioned members are separated from each other and from the edges of the members by opaque masking means.

4. In combination with the structure claimed in claim 1, a third member having a transparent body divided into substantially horizontal areas and a fourth member having a transparent body divided into substantially vertical areas, the horizontal areas of the third member, excepting for the lowermost, having at one side a designation of the filters of the first member followed by a repetition of the transmissivity curves thereof, and the areas of the fourth member, excepting for a side area, having at their lower ends, a designation of the filters of the second member followed in an upward direction by a repetition of the transmissivity curves thereof, whereby when said third and fourth members are superposed, the transmissivity curves of the several filters which are lapped in a similar superposition of members one and two will be shown in superposed relationship.

5. The structure claimed in claim 1 wherein the filters of the first and second members are separated from each other by at least the width of the areas themselves so as to provide additional windows, when said members are superposed, which windows are devoid of color filters, said additional windows for each member containing representations of the transmissivity curve of the adjacent window, said transmissivity curves being superposed when said members are superposed.

6. The structure claimed in claim 5 including masking means.

7. The structure claimed in claim 4 wherein the transmissivity curves on the third and fourth members are reproduced in colors substantially similar to the colors of the respective filters to which they appertain.

8. In a demonstration device for subtractive color phenomena, transparent supporting means divided into a plurality of windows, said windows constituting groups of four, a first window in each group being covered with a transparent color filter having a particular transmissivity curve, a vertically subjacent window being covered with the same filter and also another transparent filter having a specifically different transmissivity, a laterally adjacent window with respect to the first mentioned window carrying in combination the transmissivity curves of the two mentioned filters, and a window vertically subjacent to the last mentioned window being covered with the second mentioned filter.

9. The structure claimed in claim 8 including masking means for dividing said windows from each other.

10. The structure claimed in claim 8 wherein the third mentioned window of each group includes a third curve which is a combination of the transmissivity curves of the two mentioned filters.

References Cited in the file of this patent

UNITED STATES PATENTS

| | | |
|---|---|---|
| 377,086 | Schroeder | Jan. 31, 1888 |
| 898,290 | Wagner | Sept. 8, 1908 |
| 2,899,755 | Terilli | Aug. 18, 1959 |